(12) United States Patent
Krenz et al.

(10) Patent No.: US 10,374,426 B2
(45) Date of Patent: Aug. 6, 2019

(54) ENHANCED POWER SIGNALING SYSTEM

(71) Applicant: Hamilton Sundstrand Corporation, Charlotte, NC (US)

(72) Inventors: Michael Krenz, Roscoe, IL (US); Ira W. Grimmett, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 110 days.

(21) Appl. No.: 15/722,242

(22) Filed: Oct. 2, 2017

(65) Prior Publication Data
US 2019/0052078 A1 Feb. 14, 2019

Related U.S. Application Data

(60) Provisional application No. 62/544,025, filed on Aug. 11, 2017.

(51) Int. Cl.
*H02J 3/00* (2006.01)
*H02J 3/18* (2006.01)
*G06F 11/30* (2006.01)
*G06F 1/30* (2006.01)
*H02J 3/14* (2006.01)

(52) U.S. Cl.
CPC ............ *H02J 3/005* (2013.01); *G06F 1/30* (2013.01); *G06F 11/3058* (2013.01); *H02J 3/14* (2013.01); *H02J 3/18* (2013.01)

(58) Field of Classification Search
CPC ..... H02J 3/005; H02J 3/14; H02J 3/18; G06F 11/3058; G06F 1/30
See application file for complete search history.

(56) References Cited

U.S. PATENT DOCUMENTS 8,823,205 B2   9/2014  Krenz
9,178,358 B2   11/2015 Jouper
9,389,665 B1   7/2016  Hagen

*Primary Examiner* — Robert L Deberadinis
(74) *Attorney, Agent, or Firm* — Cantor Colburn LLP

(57) ABSTRACT

A power system includes one or more loads operable responsive to electrical power. The power system also includes a power controller operable to monitor one or more power sources, selectively provide electrical power from the one or more power sources to the one or more loads, and provide one or more power system status indicators to the one or more loads. The one or more power system status indicators trigger a modification to a startup process or trigger a shutdown process of the one or more loads.

20 Claims, 7 Drawing Sheets

ENHANCED POWER SIGNALING SYSTEM

CROSS-REFERENCE TO RELATED APPLICATION

This application claims the benefit of priority to U.S. Provisional Application No. 62/544,025 filed Aug. 11, 2017, the disclosure of which is incorporated herein by reference in its entirety.

BACKGROUND

Exemplary embodiments pertain to the art of providing power to electronic systems and, in particular, managing the provision of power to systems during startup and shutdown operations.

Electronics boxes in an aircraft that have a need for persistent memory, or a requirement to function through short power interrupts, typically have to locally store the energy required to perform that function. Power holdup circuitry to accomplish this task is not trivial, and solutions can be inconsistent across the aircraft electronics systems. Further, in some cases, when an electronics box is being powered on, a "cold start routine" may be required to fully check the operability of the box prior to performing aircraft control functions. A cold start routine can be time consuming and involve a number of diagnostic tests and resources. Finally, boxes that share responsibility for system functionality with other redundant boxes may be more complex at power up without knowing if their "partner" boxes are already powered on and functioning.

BRIEF DESCRIPTION

According to one embodiment, a power system includes one or more loads operable responsive to electrical power. The power system also includes a power controller operable to monitor one or more power sources, selectively provide electrical power from the one or more power sources to the one or more loads, and provide one or more power system status indicators to the one or more loads. The one or more power system status indicators trigger a modification to a startup process or trigger a shutdown process of the one or more loads.

In addition to one or more of the features described above or below, or as an alternative, further embodiments may include where the one or more power system status indicators include a power warning signal indicative of an impending interruption of electrical power to a first load of the one or more loads within a predetermined period of time, and the first load can be operative to initiate an accelerated shutdown process responsive to the power warning signal and store recovery data prior to the predetermined period of time elapsing.

In addition to one or more of the features described above or below, or as an alternative, further embodiments may include assurance from the power controller that once interrupted, the power will remain off for a predetermined period of time before reapplication of power.

In addition to one or more of the features described above or below, or as an alternative, further embodiments may include where the power controller sets the power warning signal based on detecting a reduction in power supply capacity of the one or more power sources.

In addition to one or more of the features described above or below, or as an alternative, further embodiments may include where the power controller is operable to monitor a period of time that the one or more loads were depowered prior to startup, and the one or more power system status indicators can include a cold start signal indicative of the one or more loads being depowered for a period of time that is greater than a threshold period before receiving electrical power at startup.

In addition to one or more of the features described above or below, or as an alternative, further embodiments may include where the one or more loads are operable to select between performing a normal startup process and an accelerated startup process based on the cold start signal, and the accelerated startup process executes a reduced number of startup diagnostics relative to the normal startup process.

In addition to one or more of the features described above or below, or as an alternative, further embodiments may include where the power controller is operable to monitor a power status of two or more of the one or more loads identified as partners, and the one or more power system status indicators can include a partner alive signal indicative of the power status of the partners.

In addition to one or more of the features described above or below, or as an alternative, further embodiments may include where a first load of the one or more loads is operable to check the partner alive signal associated with a second load identified as a partner of the first load and modify a synchronization operation between the first load and the second load based on a state of the partner alive signal.

In addition to one or more of the features described above or below, or as an alternative, further embodiments may include where electrical power provided to the second load is controlled by a second power controller, the power controller sends the power status of the first load to the second power controller, and the power controller receives the power status of the second load from the second power controller.

A further embodiment includes a controller of a power system. The controller includes memory and a processor operable to execute a plurality of instructions stored in the memory to perform: providing electrical power from one or more power sources to one or more loads, monitoring the one or more power sources for a reduction in power supply capacity, providing a power warning signal indicative of an impending interruption of electrical power to a first load of one or more loads within a predetermined period of time, depowering the first load based on elapsing of the predetermined period of time, and maintaining a power off state for the first load for a second predetermined period of time.

According to another embodiment, a method includes monitoring one or more power sources by a power controller, selectively providing electrical power from the one or more power sources to one or more loads by the power controller, and providing one or more power system status indicators to the one or more loads. The one or more power system status indicators trigger a modification to a startup process or trigger a shutdown process of the one or more loads.

Technical effects of embodiments of the present disclosure include providing power system status to loads to assist in efficient startup, shutdown, and synchronization processes.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As generally described above, electrical components of a system that may be included, for example, on an aircraft, can be turned on and turned off from time to time. At least two issues can arise in such situations. First, as described above, when an electronics box (also referred to as a "load") is powered down, a particular solution for saving persistent data is implemented that may be inconsistent with other implementations in the system. Second, when starting an electronics box for first time, a full "cold start" procedure may be required. However, in some cases, the electronics box may not have been "off" long enough to require a full cold start. In such a case, a "warm start" that skips some of the power-up diagnostic tests may be utilized. However, for a warm start to be effective in a particular electronics box, the power status of other electronics boxes may need to be known to make the determination. Finally, to simplify the electronics box power up process, it is beneficial for the power system to assure that once power is removed it remains removed for a predetermined period of time to assure complete power down of the electronics box. Disclosed herein is a comprehensive power signaling system managed by an aircraft power system that provides a system-wide solution for controlled power-up and power down of electronics boxes in a power distribution system. Although described in reference to an aircraft, it will be understood that the power system can be implemented in a number of environments, such as a power system of various types of vehicles.

Figure 1:
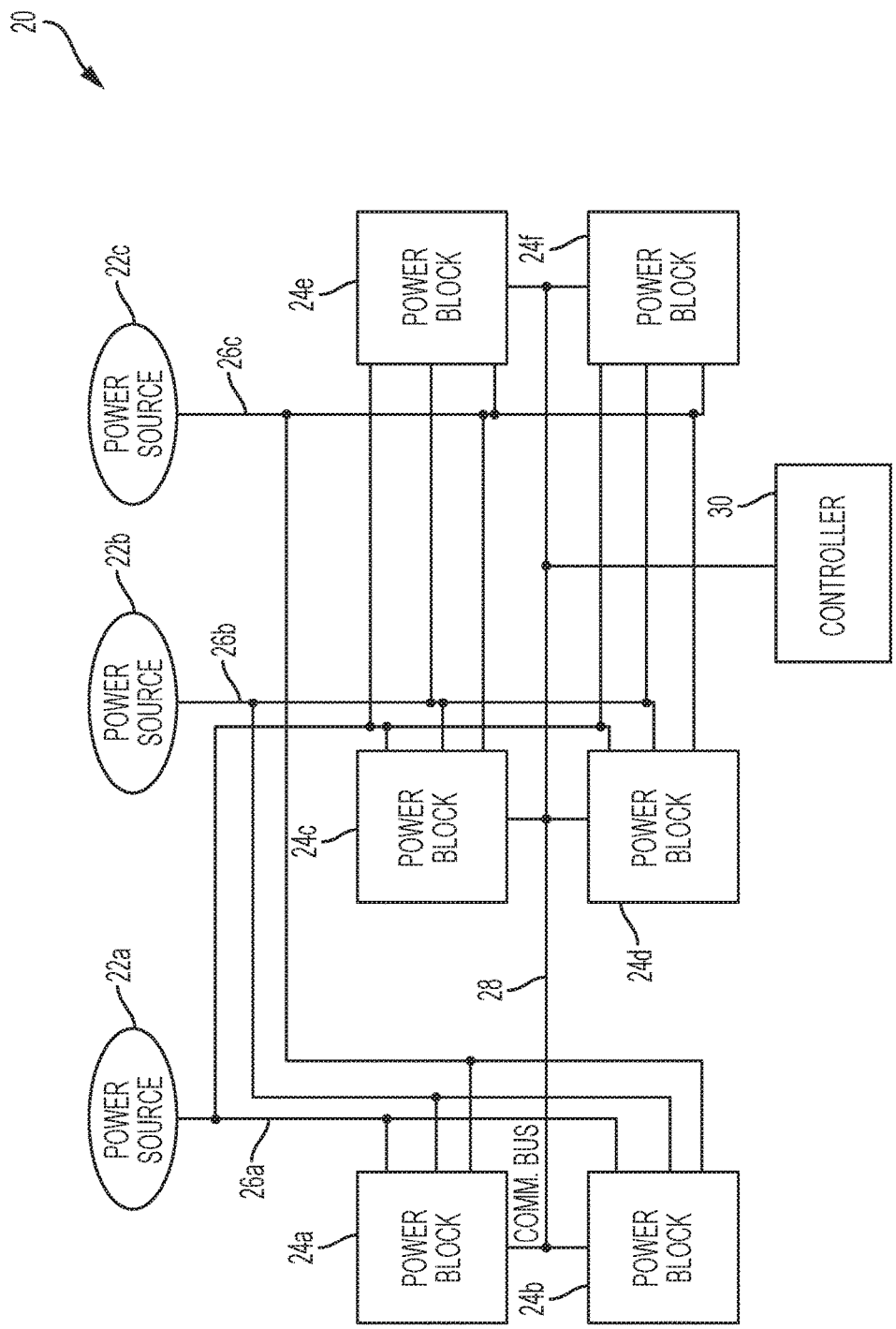
FIG. 1 is a block diagram of a power distribution system in accordance with an embodiment.

FIG. 1 is a circuit diagram of power distribution system 20 according to an embodiment of the present invention. Power distribution system 20 includes a plurality power sources 22a-22c, power blocks 24a-24f and power distribution buses 26a-26c. Each of the plurality of power blocks 24a-24f is connected to receive power from each of the plurality of power distribution buses 26a-26c, and therefore each power block 24a-24f is capable of receiving power from any one of the plurality of power sources 22a-22c. The characteristics of loads associated with power blocks 24a-24f can vary in embodiments. For example, some loads associated with power blocks 24a-24f can have varying energy consumption in terms of varying current, electromagnetic interference, and/or power factor, while other loads associated with power blocks 24a-24f can have more consistent energy consumption in terms of current flow, electromagnetic interference and/or power factor.

Each power block 24a-24f is capable of drawing power from any one of the plurality of power sources 22a-22c. For example, power block 24a is connected to each of the plurality of power sources 22a-22c, and may selectively draw power from one of the plurality of power sources 22a-22c. In the power distribution system 20, power blocks 24a-24f with variable/noisy loads can be configured to draw power from one of the plurality of power sources (e.g., power source 22a) while power blocks 24a-24f with consistent/clean loads can be configured to draw power from a different power source (e.g., power source 22c). In this way, variable/noisy loads do not adversely affect consistent/clean loads.

In one embodiment, each of the plurality of power blocks 24a-24f can be pre-programmed with information regarding the type of load (e.g., "noisy" or "clean") to which it is connected, and based on this a priori information determines the appropriate power source 22a-22c from which it should draw power. In another embodiment, rather than program the power blocks 24a-24f with information about the type of load to which it is connected, each power block 24a-24f can be programmed with information about the power source 22a-22c from which it should draw power. In both of these embodiments, prior knowledge of the system architecture (i.e., the loads which will be connected to each power block 24a-24f) may be used to program the power blocks 24a-24f.

In addition, each power block 24a-24f may further include information regarding which power sources 22a-22c to connect to in the event the current power source fails or becomes unavailable. For example, power blocks 24a, 24c and 24e may be programmed to selectively draw power from power source 22b in the event power source 22a becomes unavailable.

In the embodiment shown in FIG. 1, each power block 24a-24f is connected to communication bus 28 for communicating with other power blocks 24a-24f and/or with a controller 30 (also referred to as a system-level controller). Communication between the controller 30 and the plurality of power blocks 24a-24f may include information regarding load characteristics, power system status indicators as further described herein, and the power source 22a-22c from which the power blocks 24a-24f are currently drawing power. This information can used by the controller 30 to make determinations regarding from which power source 22a-22c each power block 24a-24f should draw power. Communication between power blocks 24a-24f and controller 30 may be used in conjunction with a priori programming such that the controller 30 coordinates power source selections for the power blocks 24a-24f in the event that one or more power sources 22a-22c become unavailable, or may be used in place of a priori programming such that the controller 30 dynamically determines the power source 22a-22c from which each power block 24a-24f will draw power. As power demand changes or the capability of one or more of the power sources 22a-22c changes, the selection of power sources 22a-22c can change and/or loads can be shed through selective depowering of less critical systems. For example, in the context of an aircraft, flight control systems may remain powered while non-essential systems are depowered. Classification and status of loads associated with each of the power blocks 24a-24f may be based on monitoring of voltage, current, power and/or combinations thereof.

In one embodiment, control of each of the plurality of power blocks 24a-24f is centralized in the controller 30, which receives inputs from each of the plurality of power blocks 24a-24f and in response provides instructions/commands to each of the plurality of power blocks 24a-24f regarding the power source 22a-22c from which the power blocks 24a-24f should draw power. In another embodiment, control of each of the plurality of power blocks 24a-24f is distributed among the plurality of power blocks 24a-24f, with no centralized controller. In this embodiment, power blocks 24a-24f communicate via communication bus 28 with one another, and determine in a distributed manner the power sources 22a-22c from which each of the plurality of power blocks 24a-24f should draw power.

Figure 2:
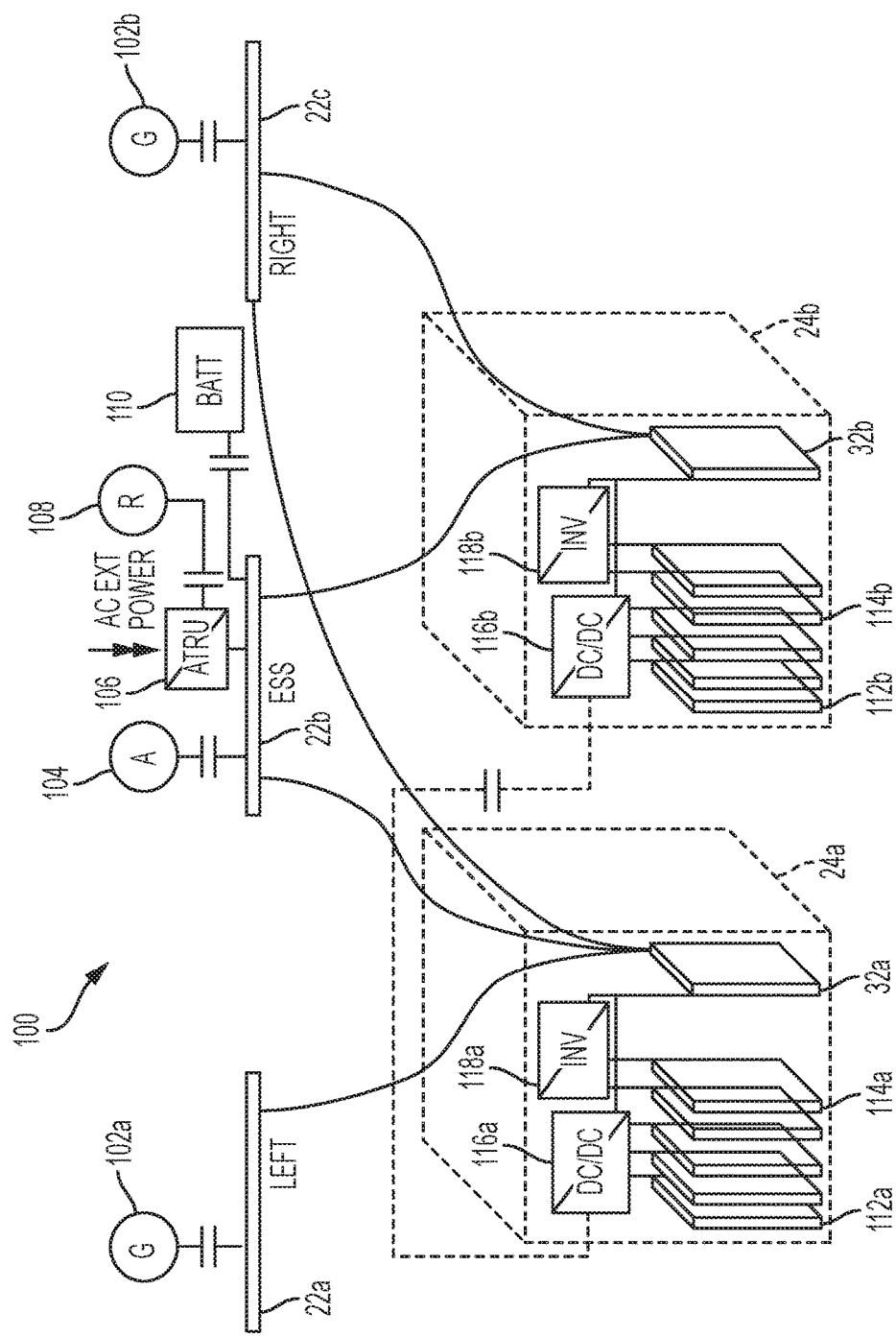
FIG. 2 is a block diagram of a power system in accordance with an embodiment.

FIG. 2 depicts a power system 100 as a portion of the power distribution system 20 of FIG. 1 in greater detail. In the example of FIG. 2, power source 22a receives electrical power from a generator 102a that may be driven by an aircraft engine on a left side of an aircraft (not depicted) that includes the power system 100. Similarly, power source 22c receives electrical power from a generator 102b that may be driven by an aircraft engine on a right side of the aircraft (not depicted) that includes the power system 100. The power source 22b can provide electrical power on an essential power bus to ensure electrical power to flight critical loads under a wide range of conditions. In the example of FIG. 2, the power source 22b can be driven by an auxiliary power unit 104, an external alternating current (AC) power source 106, a ground-based power source 108, and/or a battery 110.

The example of FIG. 2 further illustrates details of two power blocks 24a, 24b and can similarly apply to additional power blocks, such as power blocks 24c-24f of FIG. 1. Power block 24a can receive electrical power from power sources 22a-22c through a power selector 32a that selectively provides power to a plurality of DC loads 112a and AC loads 114a. Further, some loads may consume both AC and DC power. As one example, an electronics box that acts as a controller may be one of the DC loads 112a that controls the flow of AC power to an actuator that is one or the AC loads 114a. Power block 24a can also include a DC/DC converter 116a to convert a DC voltage from the power selector 32a to one or more different voltage levels for use by the DC loads 112a. The power block 24a can also include an inverter 118a operable to convert a DC voltage from the power selector 32a to an AC voltage for the AC loads 114a. Similarly, power block 24b can receive electrical power from power sources 22a-22c through a power selector 32b that selectively provides power to a plurality of DC loads 112b and AC loads 114b. Power block 24b can also include a DC/DC converter 116b to convert a DC voltage from the power selector 32b to one or more different voltage levels for use by the DC loads 112b. The power block 24b can also include an inverter 118b operable to convert a DC voltage from the power selector 32b to an AC voltage for the AC loads 114b.

Figure 3:
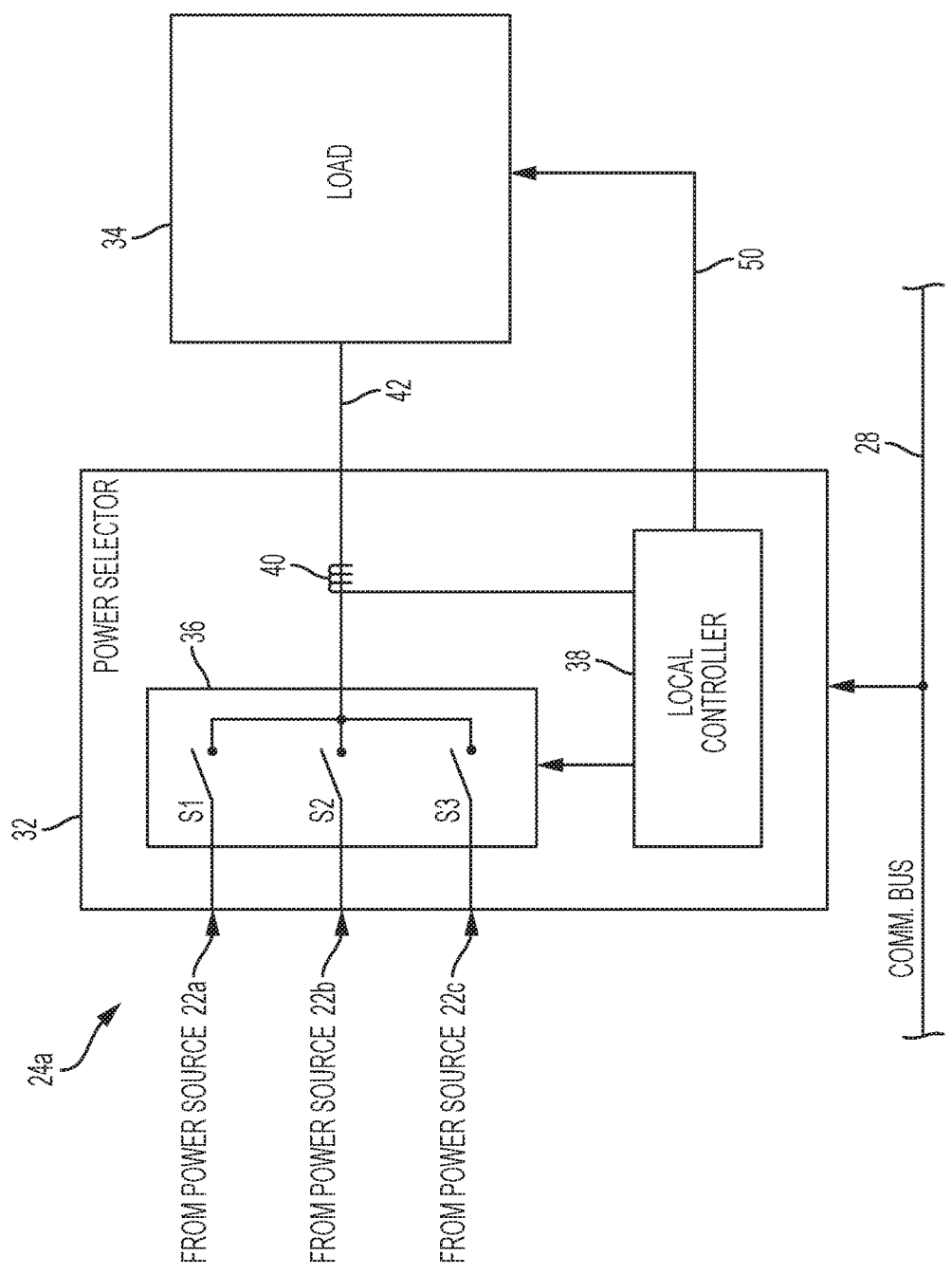
FIG. 3 is a block diagram of a power block in accordance with an embodiment.

FIG. 3 is a circuit diagram of a portion of power block 24a according to an embodiment of the present invention and can also be similarly implemented in power blocks 24b-24f of FIG. 1. In the embodiment shown in FIG. 3, power block 24a includes power selector 32 and load 34, such as one of the DC loads 112a or AC loads 114a of FIG. 2. Power selector 32, in turn, includes a switch matrix 36, local controller 38, and sensor 40. The local controller 38 is an example of a controller (also referred to as a power controller) at the power block level as opposed to the system-level controller 30 of FIG. 1.

Power from each of the plurality of available power sources 22a-22c is provided as an input to power selector 32. Within power selector 32, the switch matrix 36 includes a plurality of inputs for receiving power from each of the plurality of available power sources 22a-22c, an output for providing electrical power on power input 42 from one of the plurality of power sources 22a-22c to load 34, and a plurality of switches S1-S3 selectively controlled by the local controller 38 to determine the power source 22a-22c provided to load 34. Various switches and switch configurations may be employed to apply one of the plurality of power sources 22a-22c as power input 42 to load 34. For example, switches of the switch matrix 36 may make use of electro-mechanical switches, such as relays, or solid-state switch devices, such as metal-oxide semiconductor field-effect transistors (MOSFETs), insulated gate bipolar transistors (IGBTs), and silicon carbide (SiC) switches. Likewise, various switch configurations may be employed to multiplex power from the input of switch matrix 36 to the output of switch matrix 36.

In one embodiment, local controller 38 is programmed with a priori information regarding the type of load 34 to which it is connected (e.g., "noisy", "clean"), the power source 22a-22c to be used to supply power to load 34, and logic to set one or more power system status indicators 50 for the load 34. In this embodiment, while the local controller 38 may communicate with other power blocks 24b-24f via communication bus 28, the selection of power to be supplied to load 34 can be predetermined based on knowledge of the load 34 and the power source 22a-22c selected to source particular types of loads.

In other embodiments, local controller 38 communicates with the controller 30 (and/or other power blocks 24b-24f) to dynamically determine the appropriate power source 22a-22c to provide to load 34. Communication provided by local controller 38 may include characteristics of the load as monitored by sensor 40, determinations made by local controller 38 regarding whether the load is "noisy" or "clean", the power source 22a-22c presently connected to supply power to load 34 and/or the state of the one or more power system status indicators 50. In response, the local controller 38 receives commands/instructions from the controller 30 (and/or power blocks 24b-24f) selecting a power source 22a-22c to supply as power input 42 to load 34.

In the embodiment shown in FIG. 3, the sensor 40 is a current sensor configured to monitor electrical current supplied to the load 34. Detected transients in the monitored current can be indicative of a "noisy" load and can be used to classify the load 34 as either "noisy" or "clean". The monitored current characteristics can be communicated to the controller 30 or may be processed locally by the local controller 38 to classify the load 34 (e.g., as either "noisy" or "clean"). If processed locally, then the classification of the load 34 is communicated by the local controller 38 to the controller 30. In other embodiments, other types of sensors may be employed to monitor other characteristics (e.g., voltage, power) of the power being supplied to the load 34. Local controller 38 receives the monitored characteristics, and based on the monitored characteristics can determine whether the load is "noisy" or "clean", and/or the state of one or more power system status indicators 50. For instance, the power supplied to and/or consumed by the load 34 can impact the state of one or more of the power system status indicators 50, as described in further detail in reference to FIG. 4.

Figure 4:
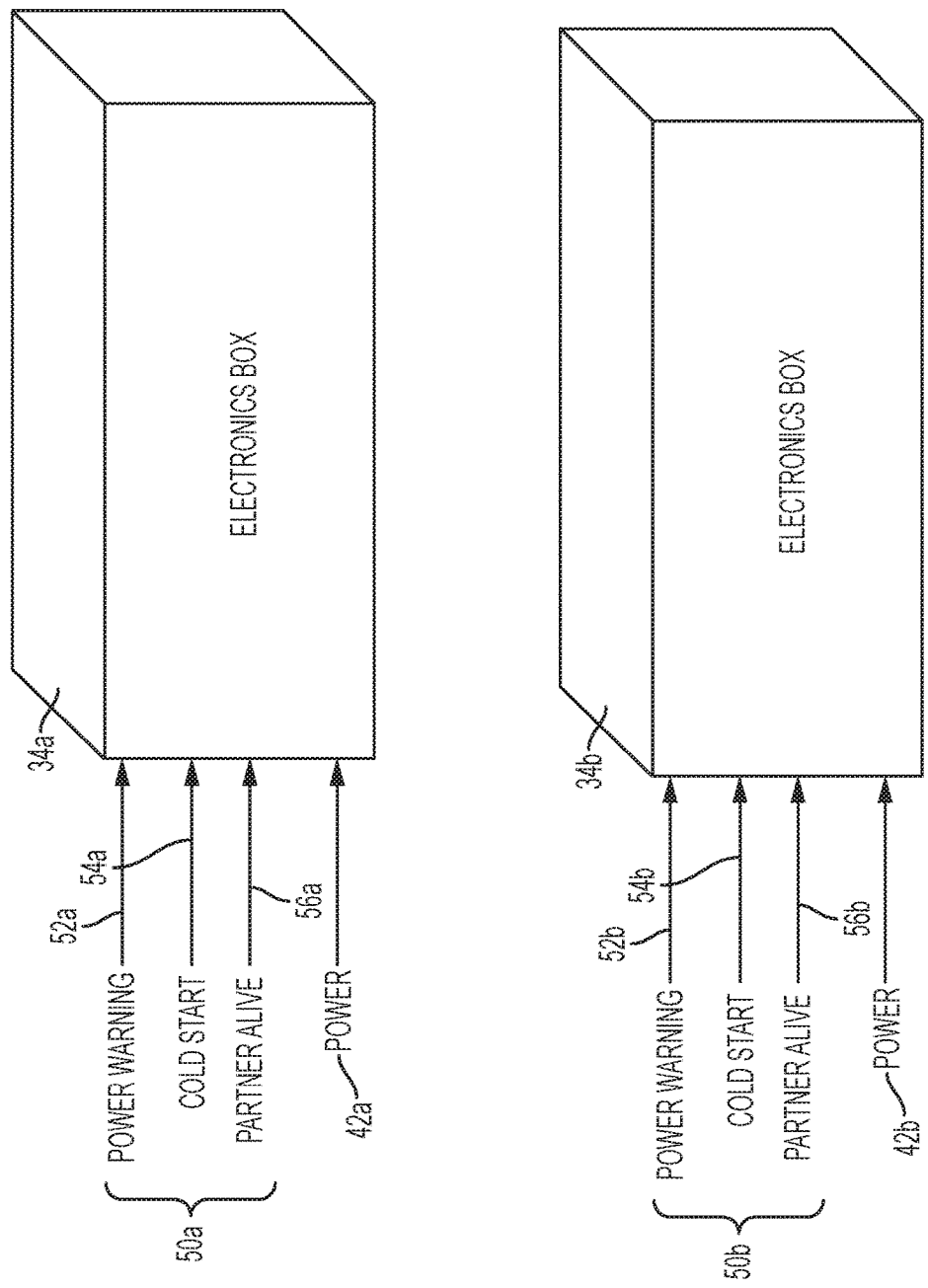
FIG. 4 depicts a pair of partner loads in accordance with an embodiment.

FIG. 4 depicts a first load 34*a* and a second load 34*b* as a pair of partner loads which may be embodied as electronics boxes in the same power block 24*a*-24*f* or in different blocks, such as in power blocks 24*a*, 24*b*. The first load 34*a* receives a first set of power system status indicators 50*a* and power input 42*a*, for instance, from controller 30 of FIG. 1 or local controller 38 of FIG. 3. Similarly, the second load 34*b* receives a second set of power system status indicators 50*b* and power input 42*b*, for instance, from controller 30 of FIG. 1 or local controller 38 of FIG. 3. The power system status indicators 50*a* can include a power warning signal 52*a*, a cold start signal 54*a*, and/or a partner alive signal 56*a*. Similarly, the power system status indicators 50*b* can include a power warning signal 52*b*, a cold start signal 54*b*, and/or a partner alive signal 56*b*. It will be understood that fewer and/or additional signals can be defined in power system status indicators 50*a*, 50*b*.

The power warning signal 52*a*, 52*b* can be asserted by controller 30, 38 when electrical power to the load 34*a*, 34*b* is going to be interrupted. From the time the power warning signal 50*a*, 50*b* is asserted until the power is interrupted, power will be supplied for a predetermined period of time. The predetermined period of time enables the load 34*a*, 34*b* to store information and gracefully shut down. An exception may result if the load 34*a*, 34*b* itself is causing the issue (e.g., short circuit), and a protective interrupt is demanded by the situation. In that case, electrical power may be interrupted immediately. A decision to remove electrical power from a load 34*a*, 34*b* can be made, for example, based on detecting an overall reduction in available power, a planned mode transition to a reduced power configuration, a scheduled reallocation of available power, and other such events. For instance, upon the loss of a primary power supply from one or more of the power sources 22*a*-22*c*, battery-based backup power can be provided through one of the power sources 22*a*-22*c* to support an accelerated shutdown of one or more of the loads 34*a*, 34*b* such that the loads 34*a*, 34*b* need not include detection and hold circuitry for each of the loads 34*a*, 34*b*. After the load 34*a*, 34*b* is depowered following assertion of the power warning signal 52*a*, 52*b* and elapsing of the predetermined period of time, the controller 30, 38 can maintain a power off state for the load 34*a*, 34*b* for a second predetermined period of time that may be different from the predetermined period of time used as a shutdown warning. For example, the second predetermined period of time can be a minimum settling time to allow temporary energy storage elements (e.g., capacitive circuits) in the load 34*a*, 34*b* to decay/discharge and/or allow other elements to reach a steady state condition before restoring power.

The controller 30, 38 can assert the cold start signal 54*a*, 54*b* before electrical power is applied to a load 34*a*, 34*b* when electrical power has not been supplied to the load 34*a*, 34*b* for a period of time that is greater than a threshold period. The threshold period may be specified either at the aircraft level, power block level, or individual load level. The cold start signal 54*a*, 54*b* can assist the loads 34*a*, 34*b* in determining whether a reduced set of diagnostic tests can be performed to reduce initialization time. Reduced tests at startup may be beneficial to rapidly recover from short-term or intermittent power losses, particularly in recovery for in-flight operations.

The partner alive signal 56*a*, 56*b* indicates that declared/defined partner loads, such as loads 34*a*, 34*b*, were already receiving power and drawing appropriate amounts of current. For example, the first load 34*a* and the second load 34*b* may collectively have shared control or primary/backup control for one or more of the same actuators. In shared control or primary/backup control, the partner alive signal 56*a*, 56*b* can assist in synchronizing actions between the loads 34*a*, 34*b*, particularly with control actions of a shared resource. For instance, if upon startup the first load 34*a* detects that the second load 34*b* is not yet alive (depowered partner) based on the partner alive signal 56*a*, the first load 34*a* can take control of any shared tasks or backup tasks of the second load 34*b*. Similarly, if upon startup, the first load 34*a* detects that the second load 34*b* is alive based on the partner alive signal 56*a*, the first load 34*a* can leave shared tasks in primary control of the second load 34*b* and revert to a backup configuration. The controller 30, 38 can be preconfigured with partner relation mappings within the power distribution system 20 of FIG. 1 with partner relationships and status thresholds for being considered "alive".

In one embodiment, implementation of the power system status indicators 50*a*, 50*b* described above can be accomplished utilizing a power district type power distribution architecture in the power distribution system 20 of FIG. 1. In a power district power distribution architecture, each power block 24*a*-24*f* or group of power blocks 24*a*-24*f* has the ability to draw power from all of the primary sources 22*a*-22*c*. As long as at least one of the primary sources 22*a*-22*c* includes an energy storage device (e.g., battery), a power district can pull power from the battery for a short (e.g., <1 second) period of time to provide a duration of power to the loads 34*a*, 34*b* associated with asserting the power warning signal 52*a*, 52*b*. Similarly, the cold start signal 54*a*, 54*b* can be defined as power not being applied to the load 34*a*, 34*b* for a threshold period for a particular load 34*a*, 34*b*. In one embodiment, the controller 30, 38 can include a record of how long a load 34*a*, 34*b* has been powered off (e.g., whether or not it was longer than the threshold period), or if the power distribution system 20 itself has been powered off, then a cold start condition exists. In addition, a given load 34*a* may need to know if other defined loads (e.g., load 34*b*) have powered off to know if a cold/warm start is required (i.e., whether the cold start signal 54*a*, 54*b* should be asserted).

In one embodiment, only two of the power system status indicators 50*a*, 50*b* may be provided. For example, the partner alive signal 56*a*, 56*b* can be omitted. The power system status indicators 50*a*, 50*b* may be implemented as discrete physical connections (e.g. Gnd/Open signals, or other types of persistent signaling) or transmitted on a bus, such as the communication bus 28 of FIG. 1.

Figure 5:
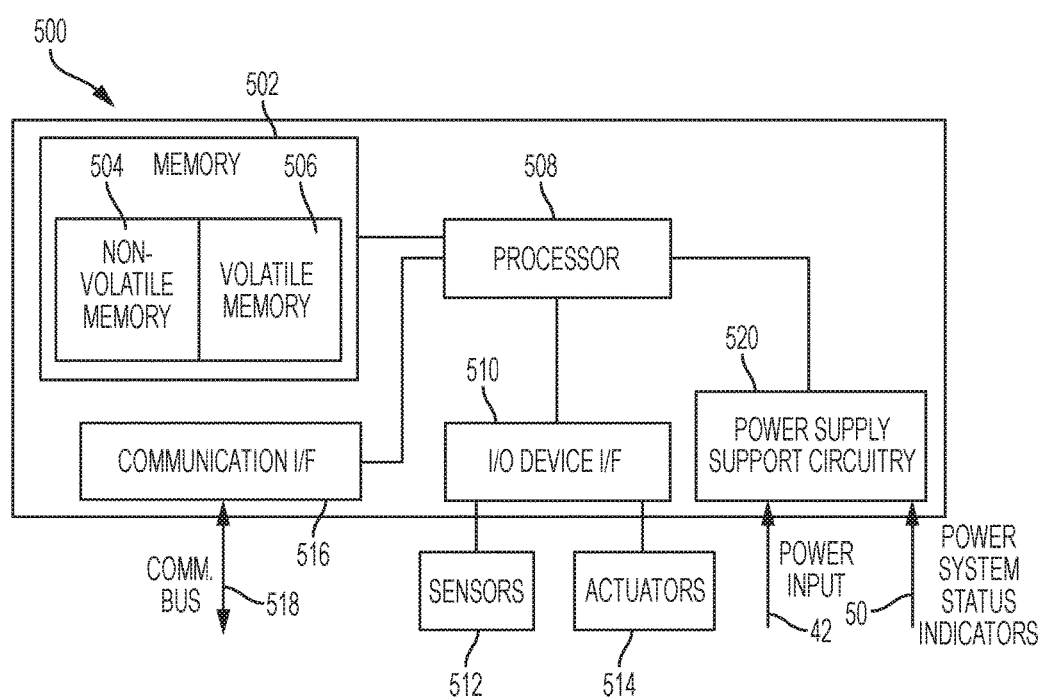
FIG. 5 is a block diagram illustrating a computing system in accordance with an embodiment.

Referring now to FIG. 5, an exemplary computing system 500 that can be incorporated into the loads 34*a*-34*b* of the present disclosure is shown. The computing system 500 may be configured as part of and/or in communication with a controller, e.g., controllers 30, 38 shown in FIGS. 1 and 3, as part of power system management as described herein. The computing system 500 can be an embedded computing device, a microcontroller, or the like and can be located at or distributed between one or more loads 34*a*-34*b*. For instance, the elements of computing system 500 can be duplicated in the loads 34*a*-34*b* and in other computing systems (not depicted). The computing system 500 includes a memory 502 which can store executable instructions and/or data associated with operation of aircraft systems. The executable instructions can be stored or organized in any manner and at any level of abstraction, such as in connection with one or more applications, processes, routines, procedures, methods, etc. As an example, at least a portion of the instructions and associated data can be initially stored in non-volatile memory 504 of the memory 502 and transferred to volatile memory 506 of the memory 502 for faster execution, record creation, and the like. Volatile memory 506 typically loses its state upon a shutdown or absent sufficient memory refreshing. Non-volatile memory 504 is persistent and maintains state between shutdown and startup.

Further, as noted, the memory 502 may store data. The data may include, but is not limited to, sensor data, event data, time history data, fault data, or any other type(s) of data as will be appreciated by those of skill in the art. The instructions stored in the memory 502 may be executed by one or more processors, such as a processor 508. The processor 508 may be operative on the data.

The processor 508, as shown, is coupled to one or more input/output (I/O) device interfaces 510 operable to receive sensor data from sensors 512 and/or command one or more actuators 514. The sensors 512 and actuators 514 can include any types known in the art for controlling and/or monitoring the health of aircraft components and systems.

The components of the computing system 500 may be operably and/or communicably connected through a communication interface 516 by one or more buses 518 that can include, for instance, communication bus 28 of FIG. 1 in some embodiments. The computing system 500 may further include other features or components as known in the art. For example, the computing system 500 may include one or more transceivers and/or devices configured to transmit and/or receive information or data from sources external to the computing system 500 (e.g., through the I/O device interface 510). For example, in some embodiments, the computing system 500 may be configured to receive information over a network (wired or wireless) or through a cable or wireless connection with one or more devices remote from the computing system 500 (e.g. direct connection to controller 30, 38, etc.). The information received over the communication bus 518 can stored in the memory 802 and/or may be processed and/or employed by one or more programs or applications and/or the processor 508.

Power input 42 can be further processed by a power supply support circuit 520 of the computing system 500 to provide various voltage levels needed within the computing system 500. The power supply support circuitry 520 can be simplified compared to other systems, as power hold support is not needed, and monitoring tasks can be simplified using the power system status indicators 50.

Figure 6:
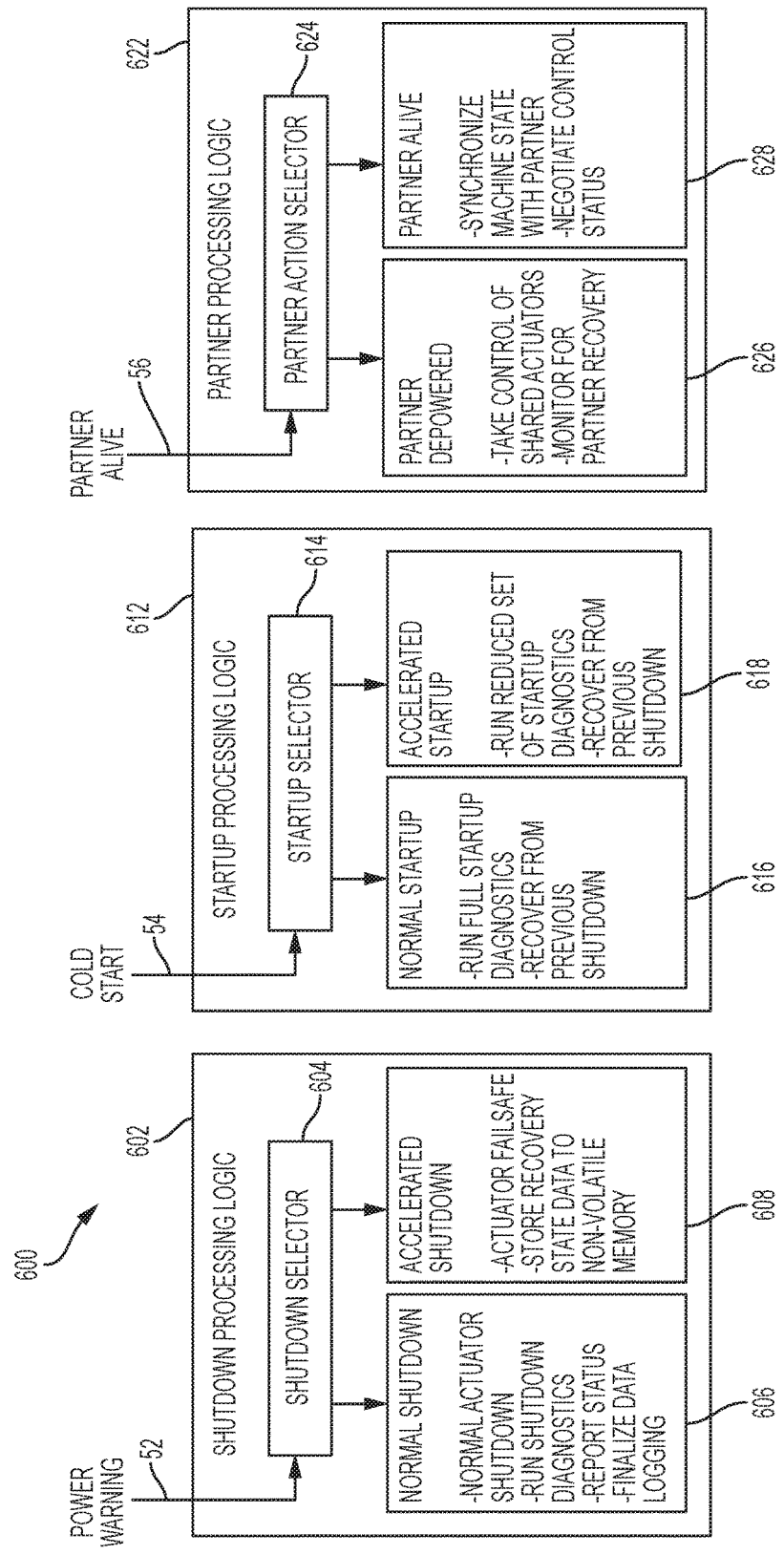
FIG. 6 is a block diagram of power system status indicator processing in accordance with an embodiment.

FIG. 6 depicts an example of power system status indicator processing 600 that can be implemented within the computing system 500 of FIG. 5. In the example of FIG. 6, shutdown processing logic 602 includes a shutdown selector 604 that monitors the state of power warning signal 52 to select between performing a normal shutdown process 606 or an accelerated shutdown process 608. The normal shutdown process 606 may be performed when a shutdown is requested that is not expedited due to an impending near-term power loss, and the accelerated shutdown process 608 can be selected to capture critical state data to support a more rapid recovery responsive to the power warning signal 52 being asserted. The normal shutdown process 606 may include, for instance, a normal actuator shutdown, execution of comprehensive diagnostics, reporting of status, and finalization of data logging. In contrast, the accelerated shutdown process 608 can include commanding one or more actuators 514 of FIG. 5 to a failsafe state and storing of recovery data into non-volatile memory 504 of FIG. 5 among other actions.

In the example of FIG. 6, startup processing logic 612 includes a startup selector 614 that monitors the state of cold start signal 54 to select between performing a normal startup process 616 or an accelerated startup process 618. The normal startup process 616 may be performed when a startup is performed with the cold start signal 54 not asserted, and the accelerated startup process 618 can be selected to responsive to the cold start signal 54 being asserted. The normal startup process 616 may include, for instance, a running a full suite of startup diagnostics and attempting to recover from a previous shutdown (e.g., extracting recovery data from non-volatile memory 504 of FIG. 5). In contrast, the accelerated startup process 618 can include running a reduced set of startup diagnostics and attempting to recover from a previous shutdown among other actions.

Further in the example of FIG. 6, partner processing logic 622 includes a partner action selector 624 that monitors the state of partner alive signal 56 to select between performing a partner depowered process 626 or a partner alive process 628. The partner depowered process 626 may be performed at startup with the partner alive signal 56 not asserted, and the partner alive process 628 can be selected to responsive to the partner alive signal 56 being asserted. The partner depowered process 626 may include, for instance, taking control of shared resources, such as one or more actuators 514 and monitoring for partner recovery. The partner alive process 628 can include synchronizing machine state with the partner and negotiating control status among other actions. For instance, the first load 34a may rapidly take control of the actuators 514 without directly communicating with the second load 34b based on the partner alive signal 56a of FIG. 4 and then exchange machine state information for synchronization with the second load 34b over the communication bus 518 when the second load 34b is indicated as being "alive" (e.g., powered and drawing expected current levels).

Figure 7:
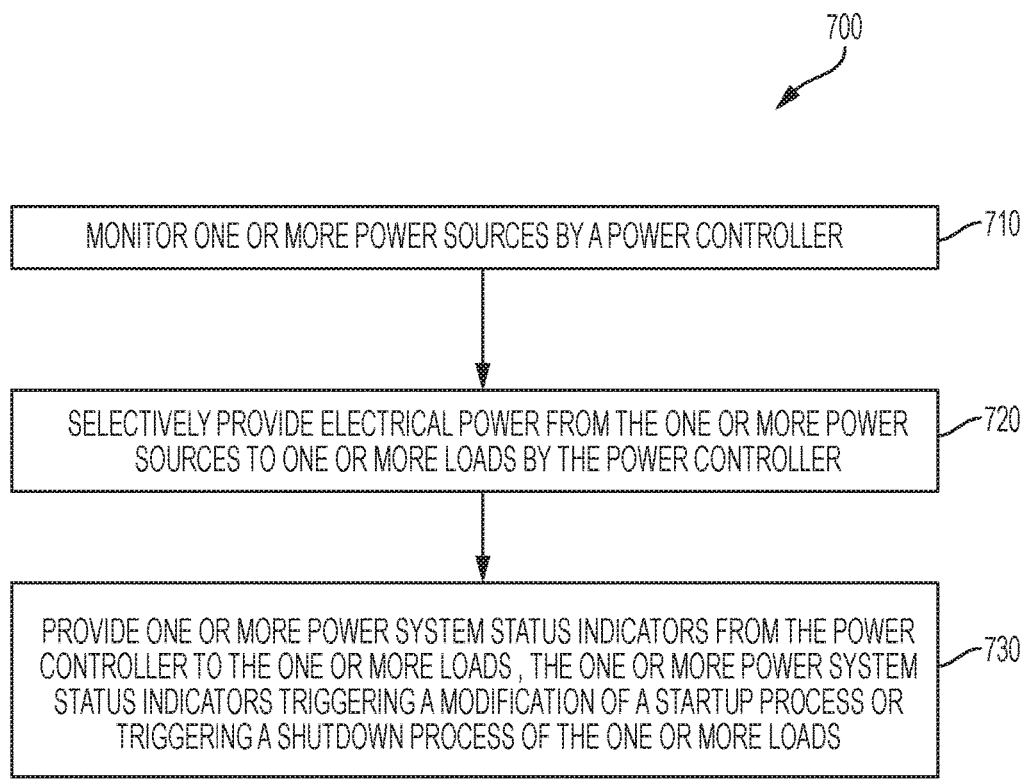
FIG. 7 depicts a flowchart of a method in accordance with an embodiment.

FIG. 7 depicts a flow process 700 can be performed by a power controller, such as controller 30, 38 of FIGS. 1 and 3 as shown and described herein and/or by variations thereon in conjunction with loads 34, 34a-34b. Various aspects of the flow process 700 can be carried out using one or more processing systems, such as the computing system 500 of FIG. 5. The flow process 700 is described in reference to FIGS. 1-7. For purposes of explanation, flow process 700 is described in reference to local controller 38 as power controller 38 in this example.

At block 710, power controller 38 can monitor one or more power sources 22a-22c. At block 720, the power controller 38 selectively provides electrical power from the one or more power sources 22a-22c to one or more loads 34. At block 730, the power controller 38 provides one or more power system status indicators 50 to the one or more loads 34. The one or more power system status indicators 50 can trigger a modification to a startup process or trigger a shutdown process of the one or more loads 34.

The one or more power system status indicators 50 can include a power warning signal 52a indicative of an impending interruption of electrical power to a first load 34a of the one or more loads 34 within a predetermined period of time. The first load 34a can initiate an accelerated shutdown process 608 responsive to the power warning signal 52a. The first load 34a may also store recovery data in non-volatile memory 504 prior to the predetermined period of time elapsing to assist with restarting the first load 34a in a known state. The power warning signal 52a can be detected by the power controller 38 based on a reduction in power supply capacity of the one or more power sources 22a-22c. The reduction can be a lowering of available voltage (including a power source loss), reduction in power quality due to noise, and/or a scheduled shedding of one or more loads 34.

The power controller 38 can also monitor a period of time that the one or more loads 34 were depowered prior to startup. The one or more power system status indicators 50 can include a cold start signal indicative 54a of the one or more loads 34 being depowered for a period of time that is greater than a threshold period before receiving electrical power at startup. The one or more loads 34 can select between performing a normal startup process 616 and an accelerated startup process 618 based on the cold start signal 54, where the accelerated startup process 618 executes a reduced number of startup diagnostics relative to the normal startup process 616.

The power controller 38 can monitor a power status of two or more of the one or more loads 34 identified as partners, where the one or more power system status indicators 50 include a partner alive signal 56 indicative of the power status of the partners. A first load 34a of the one or more loads 34 can check the partner alive signal 56a associated with a second load 34b identified as a partner of the first load 34a. A synchronization operation between the first load 34a and the second load 34b can be modified based on a state of the partner alive signal 56 (e.g., selected between a partner depowered process 626 or a partner alive process 628). Electrical power provided to the second load 34a can be controlled by a second power controller 30 (or another instance of controller 38). The power status of the first load 34a can be sent from the power controller 38 to the second power controller 30, for instance, via communication bus 28. The power controller 38 can receive the power status of the second load 34b from the second power controller 30.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure.

What is claimed is:

1. A power system comprising:
   one or more loads operable responsive to electrical power; and
   a power controller operable to monitor one or more power sources, selectively provide electrical power from the one or more power sources to the one or more loads, and provide one or more power system status indicators to the one or more loads, the one or more power system status indicators triggering a modification to a startup process or triggering a shutdown process of the one or more loads.

2. The power system of claim 1, wherein the one or more power system status indicators comprise a power warning signal indicative of an impending interruption of electrical power to a first load of the one or more loads within a predetermined period of time, and the first load is operative to initiate an accelerated shutdown process responsive to the power warning signal and store recovery data prior to the predetermined period of time elapsing.

3. The power system of claim 2, wherein the power controller sets the power warning signal based on detecting a reduction in power supply capacity of the one or more power sources.

4. The power system of claim 1, wherein the power controller is operable to monitor a period of time that the one or more loads were depowered prior to startup, and the one or more power system status indicators comprise a cold start signal indicative of the one or more loads being depowered for a period of time that is greater than a threshold period before receiving electrical power at startup.

5. The power system of claim 4, wherein the one or more loads are operable to select between performing a normal startup process and an accelerated startup process based on the cold start signal, and the accelerated startup process executes a reduced number of startup diagnostics relative to the normal startup process.

6. The power system of claim 1, wherein the power controller is operable to monitor a power status of two or more of the one or more loads identified as partners, and the one or more power system status indicators comprise a partner alive signal indicative of the power status of the partners.

7. The power system of claim 6, wherein a first load of the one or more loads is operable to check the partner alive signal associated with a second load identified as a partner of the first load and modify a synchronization operation between the first load and the second load based on a state of the partner alive signal.

8. The power system of claim 7, wherein electrical power provided to the second load is controlled by a second power controller, the power controller sends the power status of the first load to the second power controller, and the power controller receives the power status of the second load from the second power controller.

9. A controller of a power system, the controller comprising:
   memory; and
   a processor operable to execute a plurality of instructions stored in the memory to perform:
   providing electrical power from one or more power sources to one or more loads;
   monitoring the one or more power sources for a reduction in power supply capacity;
   providing a power warning signal indicative of an impending interruption of electrical power to a first load of one or more loads within a predetermined period of time;

depowering the first load based on elapsing of the predetermined period of time; and maintaining a power off state for the first load for a second predetermined period of time.

10. The controller of claim 9, wherein the processor operable to execute the plurality of instructions stored in the memory to perform:

monitoring a period of time that the one or more loads were depowered prior to startup; and outputting a cold start signal indicative of the one or more loads being depowered for a period of time that is greater than a threshold period before receiving electrical power at startup.

11. The controller of claim 10, wherein the processor operable to execute the plurality of instructions stored in the memory to perform:

monitoring a power status of two or more of the one or more loads identified as partners; and outputting a partner alive signal indicative of the power status of the partners.

12. The controller of claim 11, wherein the controller sends the power status of a first load to a second controller, and the controller receives the power status of a second load from the second controller.

13. A method comprising:

monitoring one or more power sources by a power controller;

selectively providing electrical power from the one or more power sources to one or more loads by the power controller; and providing one or more power system status indicators to the one or more loads, the one or more power system status indicators triggering a modification to a startup process or triggering a shutdown process of the one or more loads.

14. The method of claim 13, wherein the one or more power system status indicators comprise a power warning signal indicative of an impending interruption of electrical power to a first load of the one or more loads within a predetermined period of time, and the method further comprises:

initiating an accelerated shutdown process by the first load responsive to the power warning signal; and storing recovery data prior to the predetermined period of time elapsing.

15. The method of claim 14, further comprising:

setting the power warning signal by the power controller based on detecting a reduction in power supply capacity of the one or more power sources.

16. The method of claim 13, further comprising:

monitoring, by the power controller, a period of time that the one or more loads were depowered prior to startup, wherein the one or more power system status indicators comprise a cold start signal indicative of the one or more loads being depowered for a period of time that is greater than a threshold period before receiving electrical power at startup.

17. The method of claim 16, further comprising:

selecting, by the one or more loads, between performing a normal startup process and an accelerated startup process based on the cold start signal, wherein the accelerated startup process executes a reduced number of startup diagnostics relative to the normal startup process.

18. The method of claim 13, further comprising:

monitoring, by the power controller, a power status of two or more of the one or more loads identified as partners, wherein the one or more power system status indicators comprise a partner alive signal indicative of the power status of the partners.

19. The method of claim 18, further comprising:

checking, by a first load of the one or more loads, the partner alive signal associated with a second load identified as a partner of the first load; and modifying a synchronization operation between the first load and the second load based on a state of the partner alive signal.

20. The method of claim 19, wherein electrical power provided to the second load is controlled by a second power controller and the method further comprises:

sending the power status of the first load from the power controller to the second power controller; and receiving, by the power controller, the power status of the second load from the second power controller.

* * * * *